(12) United States Patent
Tian et al.

(10) Patent No.: US 9,116,066 B1
(45) Date of Patent: Aug. 25, 2015

(54) DEVICES AND METHODS FOR SYSTEM-LEVEL DISK DRIVE VIBRATION AND SHOCK TESTING

(75) Inventors: Jifang Tian, Fremont, CA (US); Hongqi Li, Redwood City, CA (US); William Flynn, San Jose, CA (US); Xiaoping Hu, Milpitas, CA (US); Francisco Obregon, Ripon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 687 days.

(21) Appl. No.: 13/458,863

(22) Filed: Apr. 27, 2012

(51) Int. Cl.
*G01M 7/02* (2006.01)
(52) U.S. Cl.
CPC .................................. *G01M 7/027* (2013.01)
(58) Field of Classification Search
None
See application file for complete search history.

(56) References Cited

U.S. PATENT DOCUMENTS

| | | | |
|---|---|---|---|
| 3,716,965 A * | 2/1973 | Douglas ........................ 54/46.2 |
| 4,988,300 A * | 1/1991 | Yamaguchi et al. .......... 434/247 |
| 5,235,482 A | 8/1993 | Schmitz |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,272,694 B1 | 8/2001 | Knoth et al. |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,538,839 B1 | 3/2003 | Ryan |

(Continued)

OTHER PUBLICATIONS

Widrow, B., et al. "Adaptive noise cancelling: Principles and applications," Proceedings of the IEEE 63 (12), 1692-1716, 1975.

(Continued)

*Primary Examiner* — Robert R Raevis (57) ABSTRACT

A vibration testing apparatus comprises a first mooring bar coupled to the base; a second mooring bar coupled to the base such that the second mooring bar is disposed away from and faces the first mooring bar to define a space between the first and second mooring bars; a first strap comprising a first end secured to the first mooring bar, and a second strap comprising a first end secured to the first mooring bar. A second end of each of the first and second straps may be secured to the second mooring bar such that the first and second straps span the space between the first and second mooring bars and such that a tension on at least one of the first and second strap is controllable.

20 Claims, 8 Drawing Sheets

(56) References Cited

U.S. PATENT DOCUMENTS

| | | |
|---|---|---|
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,966 B1 | 3/2004 | Codilian et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,914,743 B1 | 7/2005 | Narayana et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,882 B2 | 10/2005 | Kisaka |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |

(56) References Cited

U.S. PATENT DOCUMENTS

| | | | |
|---|---|---|---|
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,916 B2 | 5/2008 | Semba et al. |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,486,470 B1 | 2/2009 | Semba |
| 7,505,231 B1 | 3/2009 | Golgolab et al. |
| 7,529,057 B1 | 5/2009 | Sutardja |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 8,922,938 B1 | 12/2014 | Chen et al. |
| 2010/0242420 A1* | 9/2010 | Minniti et al. ............ 54/23 |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

OTHER PUBLICATIONS

B. Widrow, et al., "On Adaptive Inverse Control," Record of the Fifteenth Asilomar Conference on Circuits, Systems and Computers, pp. 185-189, Nov. 1981.

Chi, Hsiang-Feng, et al., "Band-limited feedback cancellation with a modified filtered-X LMS algorithm for hearing aids," Speech Communication, Jan. 2003, vol. 39, No. 1-2, pp. 147-61.

Kuang-Yang Tu, et al., U.S. Appl. No. 13/927,096, filed Jun. 25, 2013, 18 pp.

* cited by examiner

DEVICES AND METHODS FOR SYSTEM-LEVEL DISK DRIVE VIBRATION AND SHOCK TESTING

BACKGROUND

To qualify electronic devices, extensive testing is carried out to ensure that the devices do not fail in the hands of consumers. Such testing often involves subjecting the electronic device to shocks and vibrations to determine not only whether the devices survive the testing but are able to continue operating nominally while subjected to such shock and vibrations.

Shaker tables are often used for this purpose. The electronic device under test is secured to a shaker table, which then subjects the electronic device under test to vibrations having predetermined peak amplitudes and frequencies. Problems arise in the manner in which the electronic device is secured to the table. Conventionally, to secure the electronic device to the shaker table, a large mass is used to clamp the electronic device to the shaker table, which adds unwanted dynamic inertial force to the system, skewing results. Alternatively, other conventional methods use foam to secure the electronic device to the shaker table, which adds little dynamic inertial force to the system, but does not immobilize the electronic device with respect to the shaker table, causing the electronic device to undesirably jump and knock against the shaker table when the shaker table is turned on, thereby subjecting the electronic device under test to greater stresses than are intended.

DETAILED DESCRIPTION

Figure 1:
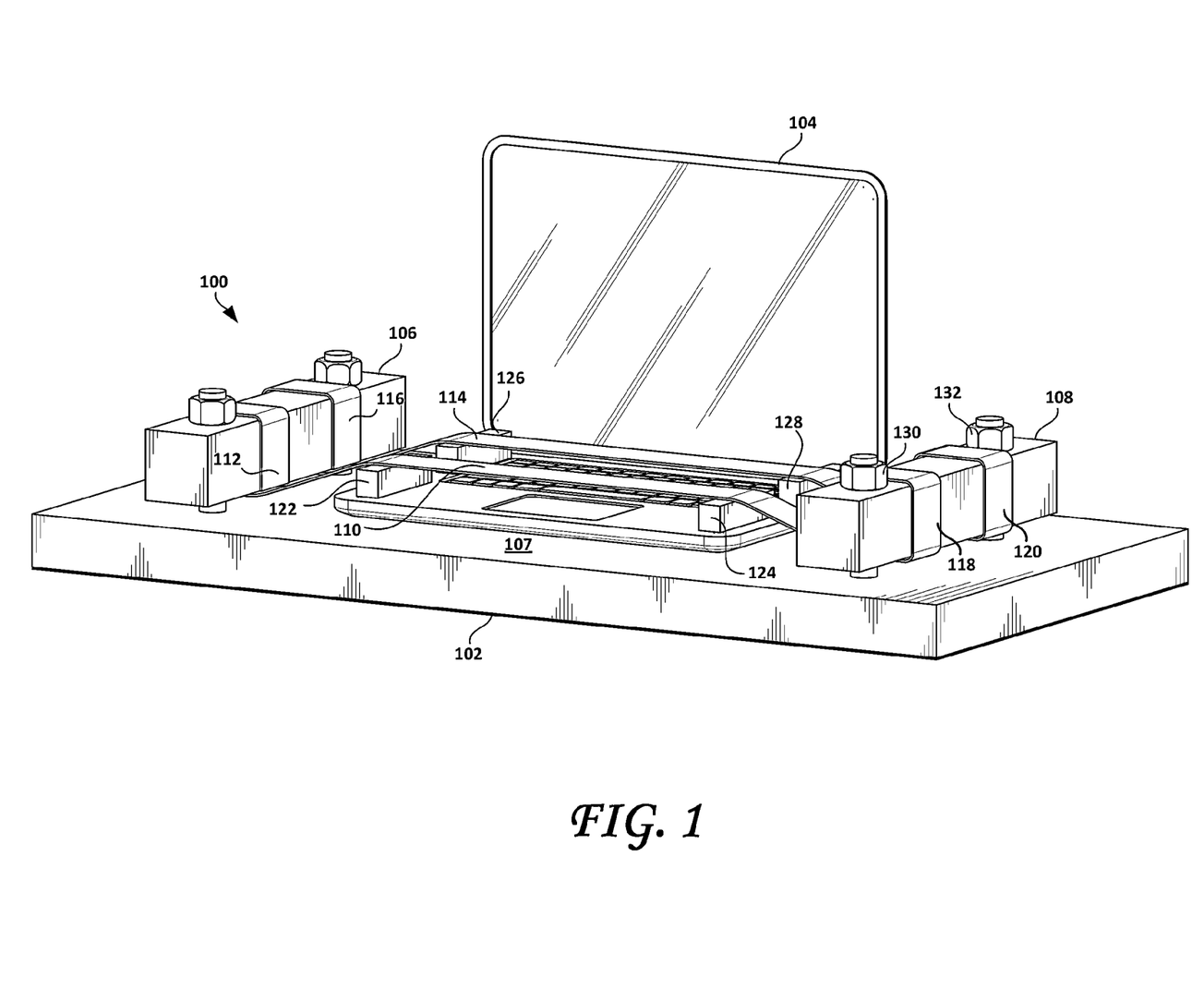
FIG. 1 shows a vibration testing apparatus, according to one embodiment.

FIG. 1 shows a vibration testing apparatus 100, according to one embodiment. The vibration testing apparatus 100 may comprise a base 102. The base 102 may be configured to be secured to a shaker table. Alternatively, the base 102 may be or comprise a surface of the shaker table. The shaker table may be configured to subject the vibration testing apparatus and an electronic device coupled thereto to predetermined vibrations and shocks. In FIG. 1, the electronic device is a laptop computer 104. According to one embodiment, the electronic device may be or comprise a disk drive. For example, the electronic device may be or comprise an external disk drive.

As shown in FIG. 1, the vibration testing apparatus 100 may comprise a first mooring bar 106 coupled to the base 102. A second mooring bar 108 may be coupled to the base 102 such that the second mooring bar 108 is disposed away from and faces the first mooring bar 106 to define a space 107 between the first mooring bar 106 and the second mooring bar 108. The first and second mooring bars 106, 108 may comprise most any rigid material, such as high density plastic, metal or even wood. The vibration testing apparatus 100 may comprise a first strap 110 defining a first end 112 secured to the first mooring bar 106, and a second strap 114 defining a first end 116 secured to the first mooring bar 106. The second end 118 of the first strap 110 may be secured to the second mooring bar 108 and the second end 120 of the second strap 114 may be secured to the second mooring bar 108, as shown in FIG. 1.

As shown, the first and second straps 110, 114 span the space 107 between the first and second mooring bars 106, 108. According to one embodiment, the first and second straps 110, 114 may be coupled to the first and second mooring bars 106, 108 such that the tension on the first and second straps 110, 114 is controllable—that is, the first and/or second straps 110, 114 may be selectably and controllably tightened.

According to one embodiment, the electronic device, such as laptop computer 104, may be disposed within the space 107 between the first and second mooring bars 106, 108. To firmly clamp the electronic device between the first and second straps 110, 114 and the base 102, spacers may be used. For instance, the testing apparatus 100 may comprise first and second spacers 122, 124 that may be positioned such that at least a portion thereof is disposed between the base 102 and the first strap 110. Likewise, third and fourth spacers 126, 128 may be positioned such that at least a portion thereof is disposed between the base 102 and the second strap 114. Such spacers 122, 124, 126, 128 limit the area of the electronic device 104 on which the clamping force is exerted by the straps 110, 114. According to one embodiment, the spacers 122, 124, 126 and 128 may be disposed such that they are over the strongest and most rigid portion of the electronic device 104. As shown in FIG. 1, such spacers 122, 124, 126 and 128 may be positioned over the feet (not shown) of the electronic device. In laptop computers, the feet are generally disposed near the four corners of the chassis of the device. The combination of sufficient tension on the straps 110, 114 and the small area onto which such tension is exerted combine to clamp the electronic device 104 securely against the base 102.

If the base 102 is then securely coupled to a shaker table or if the base 102 is or comprises a surface of the shaker table, the assembly comprising the vibration testing apparatus 100, the electronic device 104 and the shaker table will tend to move and vibrate monolithically, without subjecting the electronic device 104 to spurious vibrations and shocks against the base 102 of the vibration testing apparatus 100. In the embodiment of FIG. 1, the tension on the first and second straps 110, 114 may be selectively adjusted by tightening the bolts 130 and 132. Tightening the bolts 130 enables the position of the second mooring bar 108 is configured to adjustable in a direction that is substantially perpendicular to the base 102 to enable the tension on the first and second straps 110, 114 to be controlled. For example, a torque wrench may be used to tighten the bolts 130, 132 equally. To precisely gauge the resulting tension on the first and second straps 110, 114, one or more load cells or other strain gauges may be used.

Figure 2:
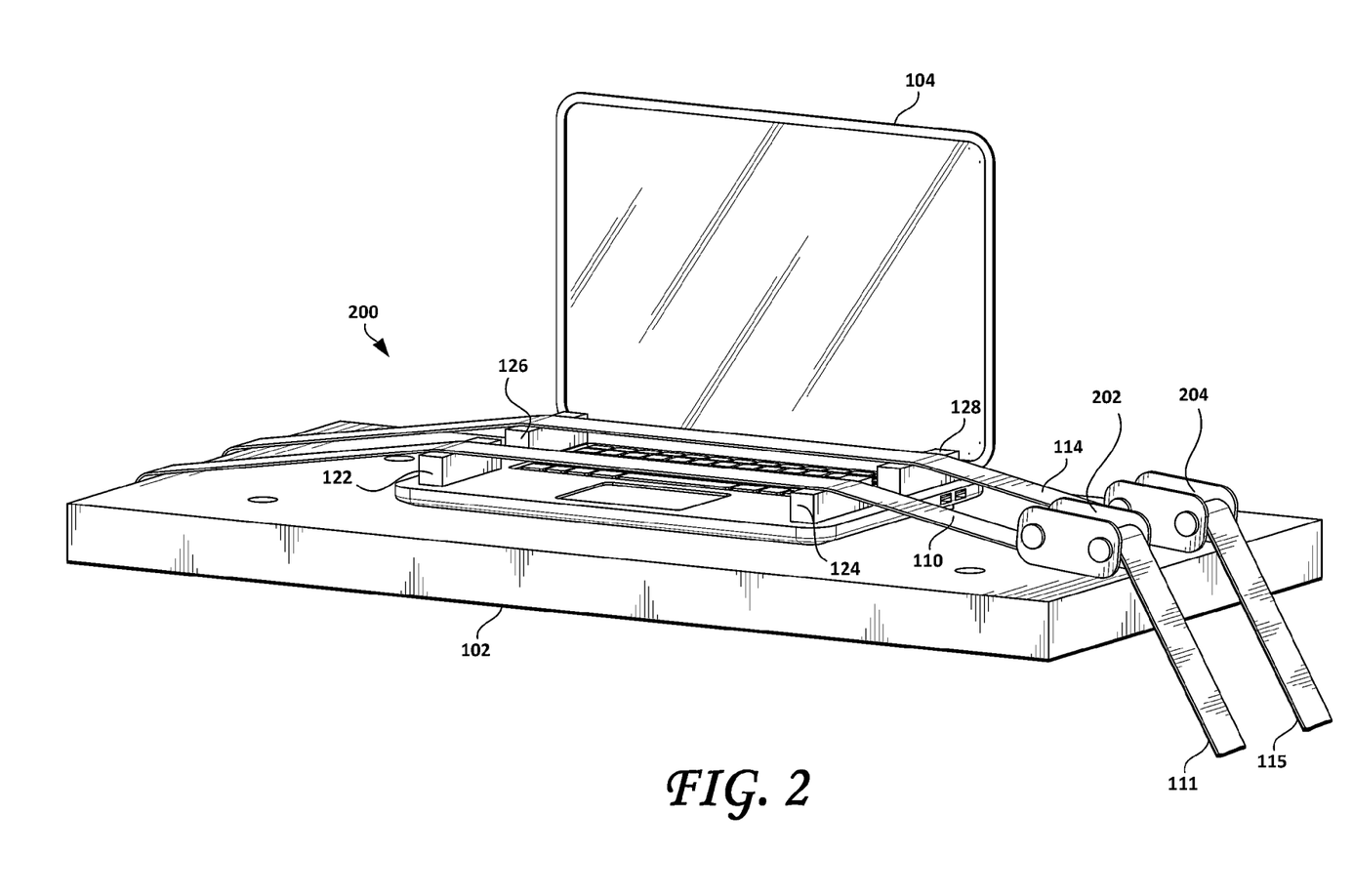
FIG. 2 shows a vibration testing apparatus, according to one embodiment.

FIG. 2 shows a vibration testing apparatus 200, according to one embodiment. As shown in FIG. 2, the first end of the first and second straps 110, 114 may be attached to the base 102 and the second ends thereof may be coupled to tensioners 202, 204, which tensioners may themselves be secured to the base 102. For example, reference numerals 202, 204 may denote ratchet belt tensioners. By pulling on the free ends 111, 115 of the first and second straps 110, 114, the tension thereon may be adjusted to a desired level, thereby securely clamping the electronic device 104 onto the base 102 of the vibration testing apparatus 200.

Figure 3:
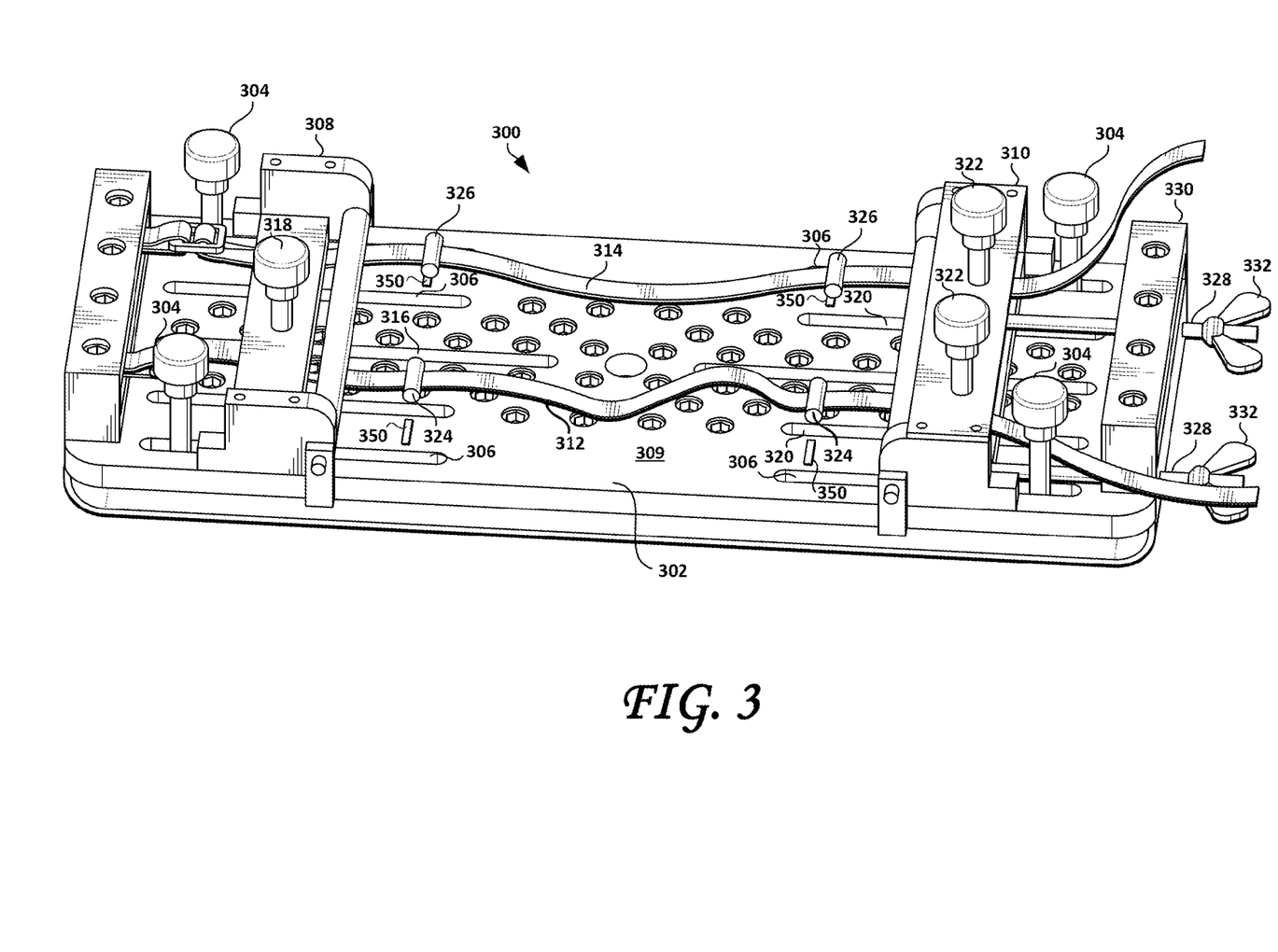
FIG. 3 shows a vibration testing apparatus, according to one embodiment.

FIG. 3 shows a vibration testing apparatus 300, according to one embodiment. As shown, the vibration testing apparatus 300 may comprise a base 302 that may be configured for attachment to a shaker table (not shown). Alternatively, the base 302 may be or comprise a surface of the shaker table. The vibration testing apparatus 300 may be securely attached to the shaker table using one or more set-posts 304 that are movable along respective slots 306 defined in the base 302. Alternatively, the set-posts 304 may directly attach to the shaker table in the embodiment in which the base 302 comprises a surface of the shaker table. Other mechanisms for securing the vibration testing apparatus to a shaker table may be implemented, as those of skill in this art will readily recognize. The vibration testing apparatus 300 may also comprise a first mooring bar 308 and a second mooring bar 310. The second mooring bar 310 may be coupled to the base 302 such that the second mooring bar 310 is disposed away from and faces the first mooring bar 308 to define a space 309 between the first and second mooring bars 308, 310. As shown, the position of the first mooring bar 308 may be adjusted along a slot 316 defined in the base 302 using one or more set-posts 318. Similarly, the position of the second mooring bar 310 may be adjusted along one or more slots 320 defined within the base 302 using one or more set posts 322.

A first end of a first strap 312 may be secured to the first mooring bar 308 and a second end thereof may be secured to the second mooring bar 310 such that the first strap 312 spans the space 309 between the first and second mooring bars 308, 310. Similarly, the vibration testing apparatus 300 may comprise a second strap 314, having a first end secured to the first mooring bar 308 and having a second end secured to the second mooring bar 310 such that the second strap 314 spans the space 309 between the first and second mooring bars 308, 310. The tension applied to one or both of the first and second straps 312, 314 may be controllable. That is, the first and/or the second strap 312, 314 may be selectably and controllably tightened. It is to be understood that the vibration testing apparatus 300 may comprise only one strap or more than two straps. Moreover, those of skill in this art may recognize that the structure and shape of the strap(s) 312 and/or 314 may be selected according to the envisaged application. For example one or more wide straps may be employed, with the wide strap(s) resembling a sheet spanning the space 309 between the first and second mooring bars 308, 310. The strap or straps may comprise or be formed of most any strong material of, for example, high tensile strength, limited elasticity and low inertia. For example, straps of woven nylon may be used.

Figure 4:
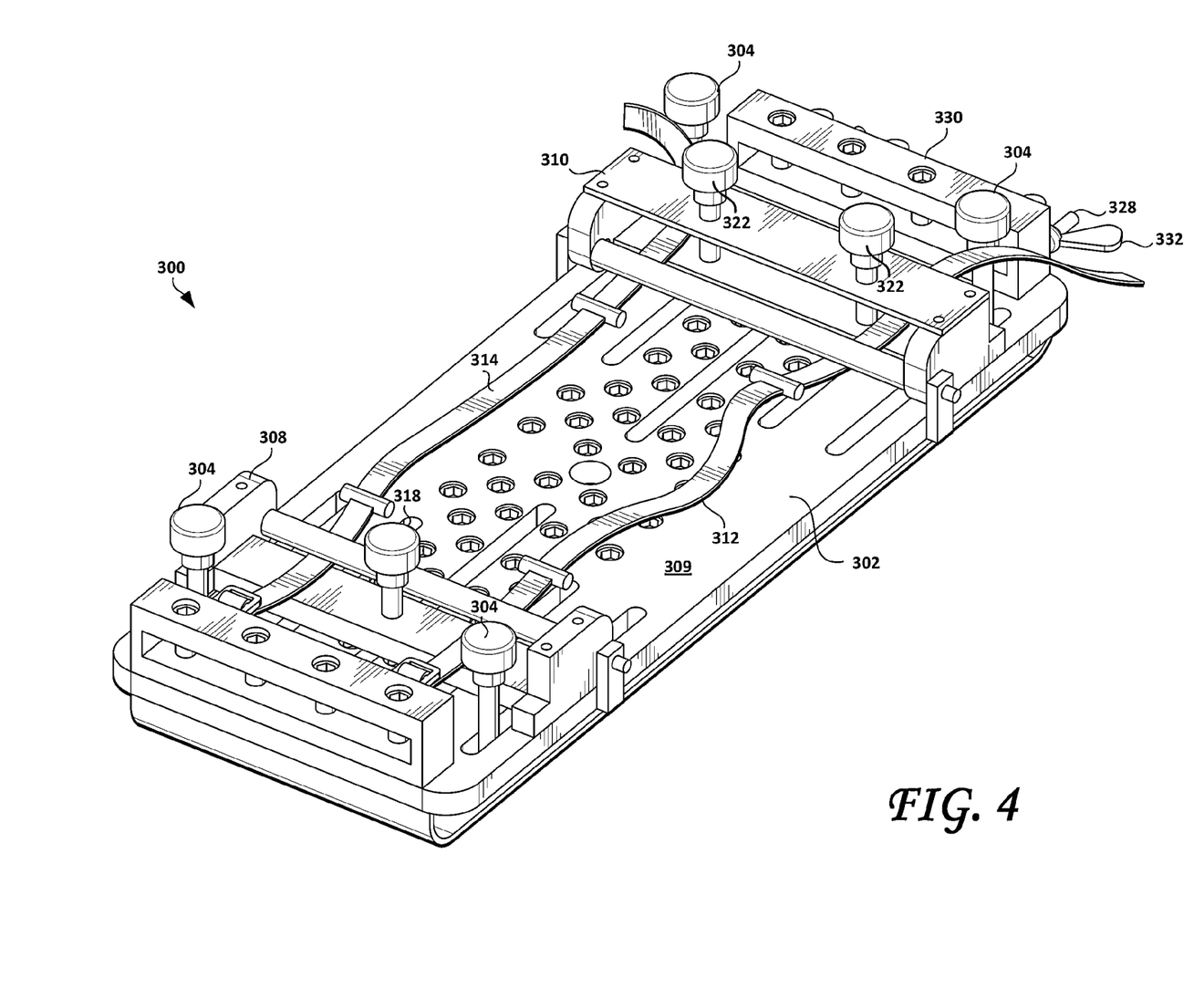
FIG. 4 shows another view of the vibration testing apparatus of FIG. 3
Figure 5:
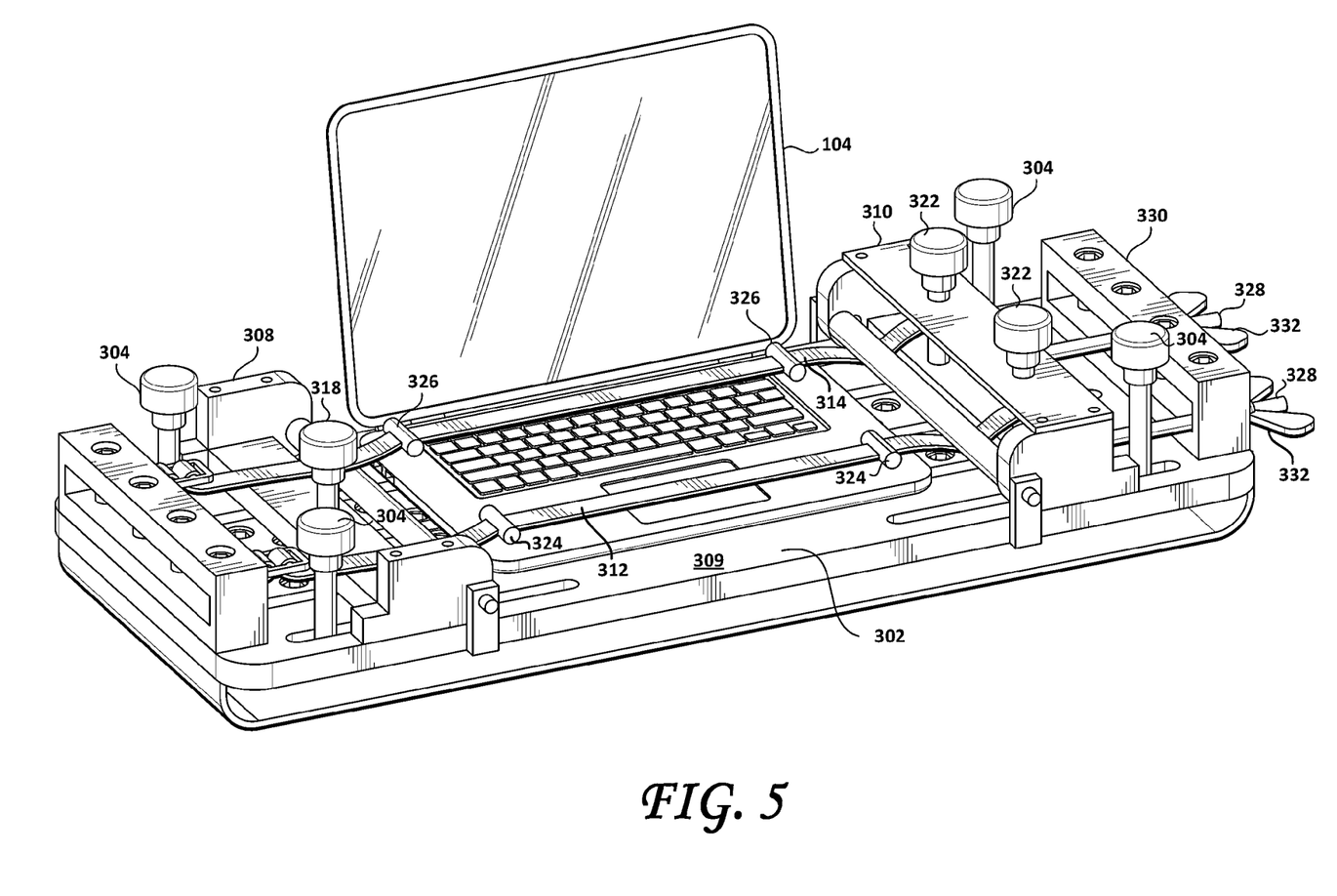
FIG. 5 shows another view of the vibration testing apparatus of FIG. 3.

The vibration testing apparatus 300 may comprise one or more spacers 324, 326. For example, first and second spacers 324 may be provided and disposed such that at least a portion thereof is disposed between the base 302 and the first strap 312. Likewise, third and fourth spacers 326 may also be provided and disposed such that at least a portion thereof is disposed between the base 302 and the second strap 314. As shown in FIGS. 3, 4 and 5, the spacers 324 may each define a slot configured to enable the first strap 312 to fit therethrough and the third and fourth spacers 326 may also each define a slot configured to enable the second strap 314 to fit therethrough, to facilitate positioning the spacers along the first and second straps 312, 314.

As shown in FIGS. 3, 4 and 5, the second mooring bar 310 may be further adjustably coupled to the base 302 to enable the tension on the first and second straps 312, 314 (if two straps are provided) to be controlled according to a position of the second mooring bar 310. For example, the second mooring bar 310 may be configured to adjustable in a direction that is substantially parallel to the base 302 to enable the tension on the first and second straps 312, 314 to be controlled. For example and as shown in FIG. 3, bolts 328 may be fitted through a terminal block 330 nearest the second mooring bar 310, the free end of the bolts 328 being received in threads defined within a corresponding receiving surface of the second mooring bar 310. As best shown in FIG. 3, nuts 332 may be fitted to the bolts 328 to enable the second mooring bar 310 to be pulled toward the terminal block 330 as the nuts 332 are tightened on their respective bolts 328. For example, the nuts 332 may be wing-nuts, as shown in the figures.

As noted above, the second mooring bar 310 may be configured to be movable to vary the space 309 between the first and second mooring bars 308, 310 and is configured to be movable to adjust the tension on the first and second straps 312, 314. Indeed, the space 309 between first and second mooring bars 308, 310 may be adjusted so as to fit an electronic device therein, such as the laptop computer shown in FIG. 5. The spacers 324, 326 may then be positioned, for example, so as to be positioned above the strongest part of the body of the electronic device to be tested. In the case of a laptop computer 104, the strongest part of the body may be above the feet of the laptop computer, situated on the underside of the chassis near the four corners thereof. The spacers 324, 326 localize any clamping force exerted by the first and second straps 312, 314 to those areas of the laptop haying contact with the spacers 324, 326. The wing nuts 332 may then be turned by the operator to draw the second mooring bar 310 to which the first and second straps 312, 314 are coupled closer to the terminal block 330, thereby tightening the first and second straps 312, 314. The angle of the straps from the first and second mooring bars 308, 310 to the spacers 324, 326 ensures that a component of the tension on the first and second straps 312, 314 is exerted downward, toward the base 302, causing the electronic device 104 to be pressed against the base 302, clamping it in place. One or more load cells (shown at 350 in FIG. 3) or other transducers may be used to quantify the clamping force exerted on the electronic device 104 by the tension of the first and second straps 312, 314. In place of a laptop computer 104, the electronic device may be or comprise, for example, an external storage device.

Figure 6:
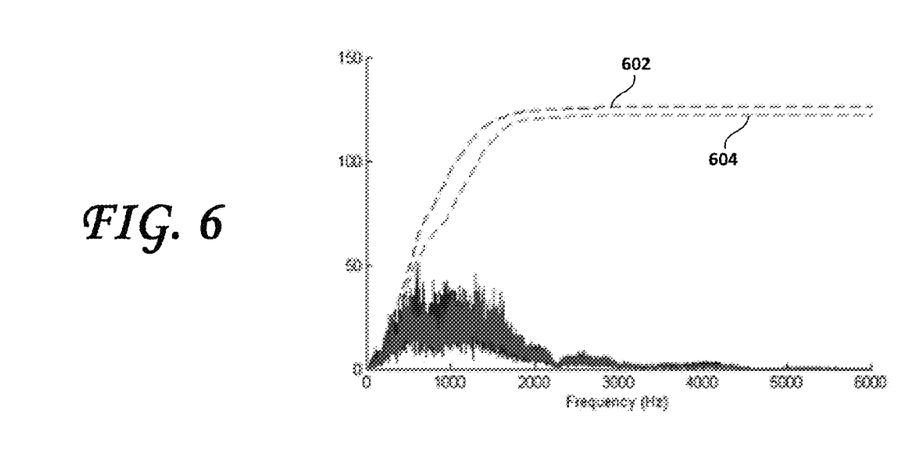
FIG. 6 is a graph showing a response vibration spectra plotted against the Position Error Signal (PES) of a disk drive within a laptop computer subjected to vibrational testing, according to one embodiment.

FIG. 6 is a graph showing a response vibration spectra plotted against the position error Signal (PES) of a disk drive subjected to vibrational testing, according to one embodiment. Indeed, FIG. 6 plots an exemplary measured vibration experienced by a disk drive within a laptop computer clamped to a vibration testing apparatus according to one embodiment. As shown, most of the vibrational energy measured is located between DC and about 2000 Hz. When experiencing such vibrations, the PES generated by the controller (a measure of the disk drive's ability to track follow accurately) is shown at reference numerals 602 and 604. Reference numeral 602 refers to the PES of a disk drive within a laptop computer that is glued to the shaker table. The case in which the laptop computer is glued to the shaker table is used as a reference, as this method of attaching the laptop computer theoretically introduces the least inertial force to the laptop computer-shaker table system. However, the use of glue for securing an electronic device to a shaker table is not practical and can damage the electronic device under test. As shown, reference 604 corresponds to the case wherein both glue and straps are used to secure the laptop computer to the shaker table. As shown, PES curves 602 and 604 are roughly comparable, demonstrating that the straps, such as first and second straps 110, 114 or 312, 314 do not introduce much inertial force. In fact, a slight decrease in the PES is observed when straps are added to the glue-only method of securing the laptop computer to the shaker table.

Figure 7:
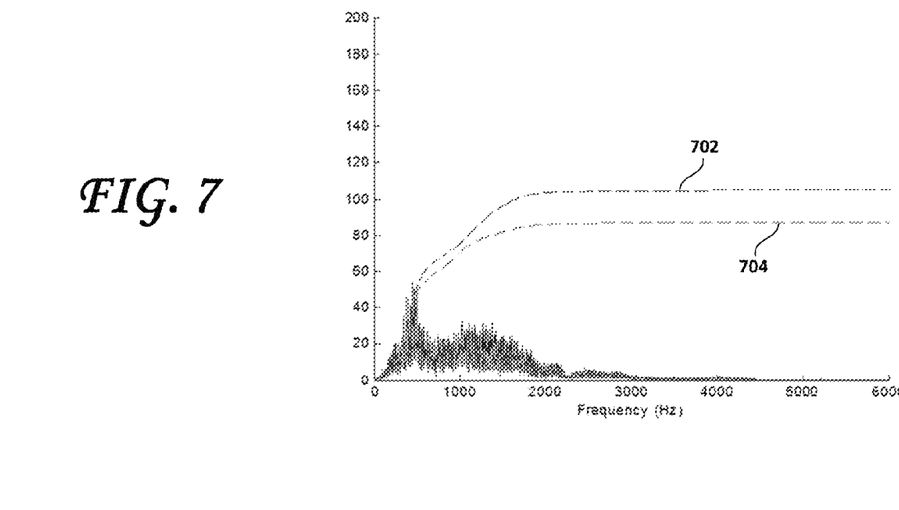
FIG. 7 is a graph showing a response vibration spectra plotted against the Position Error Signal (PES) of a disk drive within a laptop computer subjected to vibrational testing, according to one embodiment.

FIG. 7 is a graph showing a response vibration spectra plotted against the PES of a disk drive subjected to vibrational testing, according to one embodiment. Indeed, FIG. 7 plots an exemplary measured vibration experienced by a disk drive within a laptop computer clamped to a vibration testing apparatus according to one embodiment. As shown, most of the vibrational energy measured is again located between DC and about 2000 Hz. When experiencing such vibrations, the PES generated by the controller is shown at reference numerals 702 and 704. Reference numeral 702 refers to the PES of a disk drive clamped to the shaker table via a relatively heavy bar disposed across the electronic device and reference 704 represents the PES of disk drive-containing electronic device secured to a shaker table using a testing apparatus according to one embodiment. As shown, PES curve 704 exhibits a lower PES under vibration conditions than when the disk drive-containing electronic device is secured to the shaker table using the relatively heavy bar disposed across the electronic device. This can be explained by noting that the straps, such as first and second straps 110, 114 and 312, 314 do not introduce nearly as much dynamic inertial force to the electronic device and shaker table system as do the heavy bars disposed across the electronic device to secure the electronic device to the shaker table, thereby reducing the forces exerted on the electronic device during vibration and shock testing.

Figure 8:
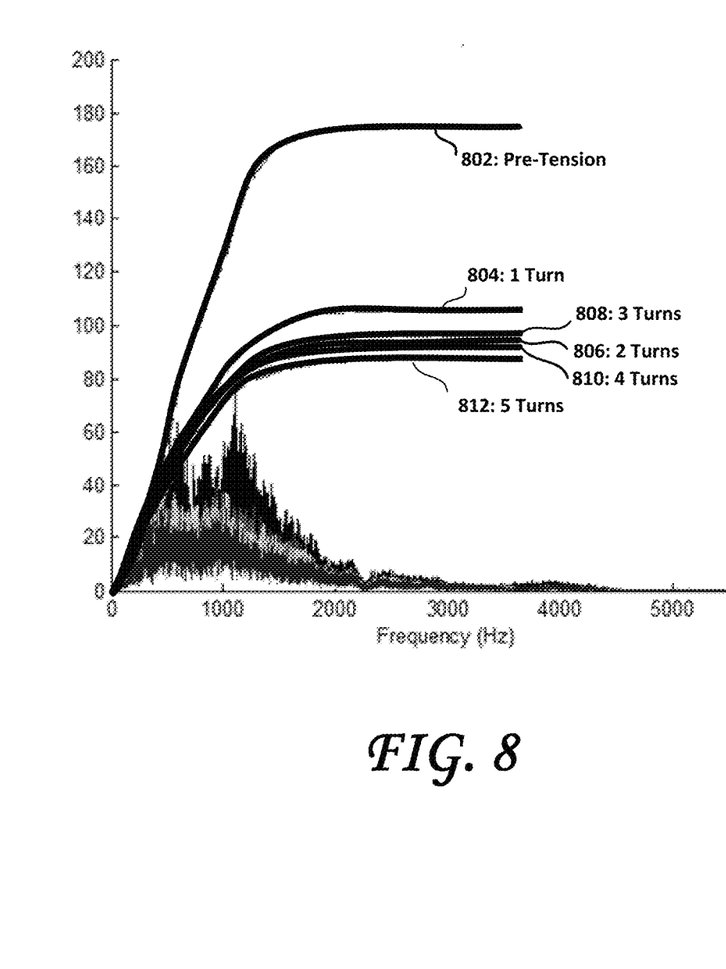
FIG. 8 is a graph plotting a response vibration spectra against PES for different strap tensions, according to one embodiment.

FIG. 8 is a graph plotting a response vibration spectra against PES for different strap tensions, according to one embodiment. Shown are the PES curves for different turns of a tensioning mechanism, such as the bolt and wing nut combination 328, 332 of FIGS. 3-5. In FIG. 8, curve 802 is pre-tension, meaning that the first and second straps 110, 114 and 312, 314 are not tightened. IN such a condition, there is no appreciable tension on the straps, nor are the straps exerting any appreciable clamping force on the base 102, 302 of the testing apparatus. Unsurprisingly, the PES signal 802 is the highest when the disk drive-containing electronic device is not firmly secured to the base 102, 302 of a vibration testing apparatus according to one embodiment. As the number of turns increases, meaning that the clamping force on the disk drive-containing electronic apparatus increases by increasing the tension on the straps 110, 114 or 312, 314, the magnitude of the PES signal gradually decreases, as the reduced vibrations enable the disk drive to track follow more efficiently. As shown, the magnitude of the PES signal decreases significantly at 1 turn, which applies some measure of clamping force on the disk drive-containing electronic apparatus against the base 102, 302. Increasing the clamping force further at two turns decreases the PES further, as shown at 806. A slight increase in PES is shown at 808 at 3 turns, followed by further decreases at 4 and 5 turns, as shown at 810 and 812, respectively. Therefore, generally speaking, the higher the clamping force imposed on the disk drive-containing electronic apparatus against the base 102, 302 of the vibration testing apparatus according to one embodiment, the lower the PES of the disk drive within the electronic device under test. In turn a lower PES indicates that the disk drive is subjected to less performance-degrading vibrations. When the tension on the straps 110, 114 or 312, 314 is high, the vibration testing apparatus-electronic device assembly behaves, from a vibrational point of view, more as a monolithic device as would be the case if the tension on the straps were to be comparatively lower, as is desired.

Figure 9:
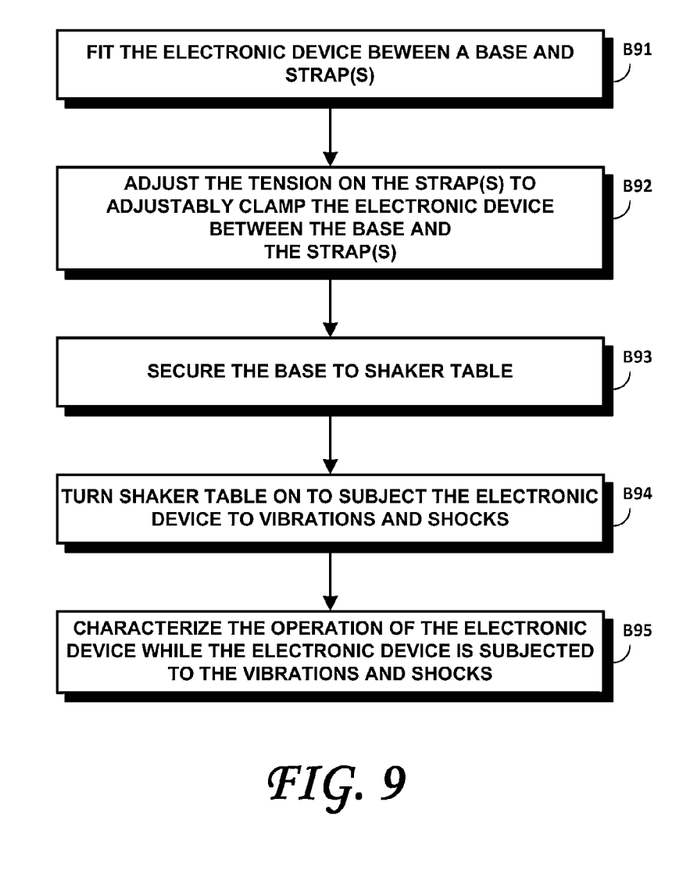
FIG. 9 is a flowchart of a method of vibration testing an electronic device, according to one embodiment.

FIG. 9 is a flowchart of a method of vibration testing an electronic device, according to one embodiment. As shown, block B91 calls for fitting the electronic device (such as a disk drive or other storage-containing electronic device, for example) between a base and one or more straps. According to one embodiment, the vibration testing apparatus may comprise only one strap configured for adjustable tensioning. Block B92 calls for adjusting the tension of the strap or straps to adjustably clamp the electronic device between the base and the straps(s). The base, such as base 102, 302, may then be secured to the shaker table, as shown at B93. Alternatively, the base 102, 302 may be or comprise a surface of the shaker table. The shaker table may then be turned on, to subject the electronic device clamped to the base to vibrations and shocks, as called for at block B94. The electronic device and/or the operation thereof may then be characterized while and/or after the electronic device is subjected to the vibrations and shocks, as shown at block B95.

The vibration testing apparatus according to one embodiment is configured to securely clamp the electronic device under test to the shaker table while introducing little excitation energy in the form of inertia force, as compared to conventional devices and methods. The force with which the testing apparatus may be clamped against the base of the vibration testing apparatus according to one embodiment may be adjustable to an optimal value that avoids damage to the electronic device under test while keeping the electronic device from jumping and clashing between the strap(s) and the base of the vibration testing apparatus. This improves testing consistency and the does not subject the electronic device to greater stresses than are intended by the shaker table.

While certain embodiments have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual structures used to selectably, adjustably and controllably clamp the electronic device under test to the vibration testing apparatus and the structures used to affix the electronic testing apparatus to a shaker table may differ from those shown in the figures and described above. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. An apparatus for vibration testing an electronic device, comprising:
    a base comprising a mechanism for securing the base to a shaker table that is configured to subject the electronic device to vibrations or shocks;
    a first mooring bar coupled to the base;
    a second mooring bar coupled to the base such that the second mooring bar is disposed away from and faces the first mooring bar to define a space that is configured to accommodate the electronic device to be vibration tested between the first and second mooring bars;
    a first strap comprising a first end secured to the first mooring bar, and
    a second strap comprising a first end secured to the first mooring bar, a second end of each of the first and second straps being secured to the second mooring bar such that the first and second straps span the space between the first and second mooring bars to secure the electronic device to the base at least during the vibration testing and such that a tension exerted on at least one of the first and second strap is controllable, to adjustably clamp the electronic device to be vibration tested to the base.

2. The apparatus of claim 1, further comprising:
    first and second spacers configured to be disposed such that at least a portion thereof is disposed between the base and the first strap, and
    third and fourth spacers configured to be disposed such that at least a portion thereof is disposed between the base and the second strap.

3. The apparatus of claim 2, wherein the first and second spacers each define a slot configured to enable the first strap to fit therethrough and wherein the third and fourth spacers each define a slot configured to enable the second strap to fit therethrough.

4. The apparatus of claim 1, wherein the base is configured to be secured to a shaker table.

5. The apparatus of claim 1, wherein the base comprises a surface of the shaker table.

6. The apparatus of claim 1, wherein the second mooring bar is adjustably coupled to the base to enable the tension on at least one of the first and second straps to be controlled according to a position of the second mooring bar.

7. The apparatus of claim 6, wherein the position of the second mooring bar is configured to be adjustable in a direction that is substantially perpendicular to the base to enable the tension on at least one of the first and second straps to be controlled.

8. The apparatus of claim 6, wherein the position of the second mooring bar is configured to adjustable in a direction that is substantially parallel to the base to enable the tension on at least one of the first and second straps to be controlled.

9. The apparatus of claim 1, wherein the second mooring bar is configured to be movable to vary the space between the first and second mooring bars and is configured to be movable to adjust the tension on at least one of the first and second straps.

10. The apparatus of claim 1, further comprising at least one load cell configured to generate a signal that is based upon the tension on at least one of the first and second straps.

11. The apparatus of claim 1, wherein the electronic device comprises a laptop computer and wherein the first and second mooring bars are adjustably coupled to the base to enable the laptop computer to be disposed in the space therebetween and wherein the tension on at least one of the first and second straps is configured to be adjustable such that the laptop computer is clamped to the base.

12. The apparatus of claim 1, wherein the electronic device comprises an external disk drive and wherein the first and second mooring bars are adjustably coupled to the base to enable the external disk drive to be disposed in the space therebetween and wherein the tension on at least one of the first and second straps is configured to be adjustable such that the external disk drive is clamped to the base.

13. A method of vibration testing an electronic device, comprising:
    fitting the electronic device between a base and first and second straps;
    adjusting a tension on at least one of the first and second straps to adjustably clamp the electronic device between the base and the first and second straps;
    securing the base to a shaker table;
    turning the shaker table on to subject the electronic device to vibrations or shocks, and
    characterizing an operation of the electronic device while the electronic device is subjected to the vibrations or shocks.

14. The method of claim 13, wherein the first and second straps are coupled to a mooring bar adjustably coupled to the base and wherein adjusting the tension on at least one of the first and second straps comprises moving the mooring bar.

15. The method of claim 14, wherein moving the mooring bar comprises moving the mooring bar in a direction substantially perpendicular to the base.

16. The method of claim 14, wherein moving the mooring bar comprises moving the mooring bar in a direction substantially parallel to the base.

17. The method of claim 14, wherein a first end of each of the first and second straps is secured near one end of the base,
    wherein a second end of each of the first and second straps is secured to the mooring bar near a second end of the base, and
    wherein adjusting the tension comprises moving the mooring bar.

18. The method of claim 14, further comprising measuring the tension on at least one of the first and second straps.

19. The method of claim 14, wherein the electronic device comprises a disk drive and wherein characterizing the operation of the disk drive comprises measuring a Position Error Signal (PES) of the disk drive.

20. The method of claim 13, wherein first ends of the first and second straps are coupled to a first mooring bar that is adjustably coupled to the base,
    wherein second ends of the first and second straps are coupled to a second mooring bar that is adjustably coupled to the base, and
    wherein fitting the electronic device comprises adjusting a position of the first and second mooring bars on the base to adjust a space therebetween.

* * * * *